W. HOUSHOLDER.
THERMOSTATIC VALVE.
APPLICATION FILED APR. 29, 1915.
1,292,469.
Patented Jan. 28, 1919.
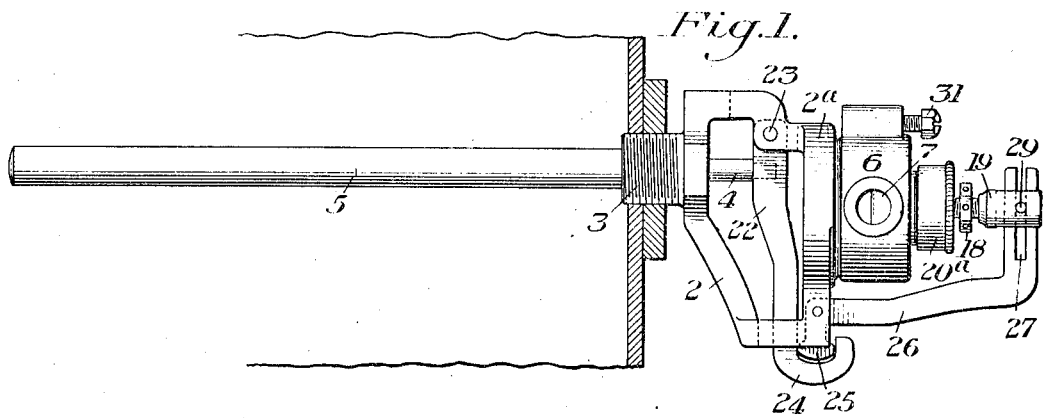
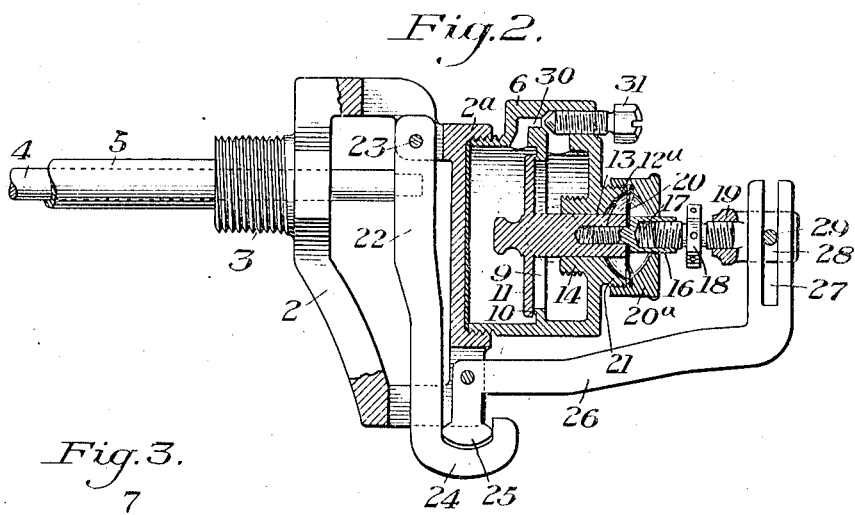
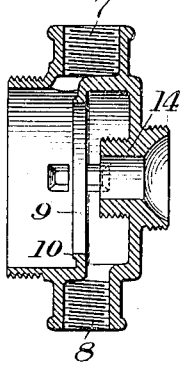
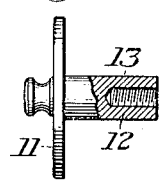
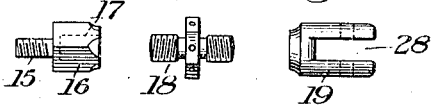
WITNESSES
R A Balderson
Jesse B. Heller
INVENTOR
Wm Housholder,
by Bakewell, Byrnes & Parmelee
Attys

UNITED STATES PATENT OFFICE.

WILLIAM HOUSHOLDER, OF YOUNGWOOD, PENNSYLVANIA, ASSIGNOR TO ROBERTSHAW MANUFACTURING COMPANY, OF YOUNGWOOD, PENNSYLVANIA, A CORPORATION OF PENNSYLVANIA.

THERMOSTATIC VALVE.

1,292,469.              Specification of Letters Patent.        Patented Jan. 28, 1919.

Application filed April 29, 1915. Serial No. 24,755.

*To all whom it may concern:*

Be it known that I, WILLIAM HOUSHOLDER, a citizen of the United States, residing at Youngwood, Westmoreland county, Pennsylvania, have invented a new and useful Improvement in Thermostatic Valves, of which the following is a full, clear, and exact description, reference being had to the accompanying drawings, forming part of this specification, in which—

Figures 1 and 2 are views partly in section and partly in side elevation of a thermostatic valve mechanism embodying my invention, and Figs. 3, 4, 5, 6 and 7 are detail views of certain of the parts hereinafter more fully described.

My invention has relation to thermostatic valve mechanism; and is designed to provide mechanism of this character in which the valve may be automatically controlled by the action of the thermostat in both its opening and closing movement, thereby obviating the use of springs for moving the valve in one direction. A further object of the invention is to provide a simple and efficient arrangement of the multiplying levers which transmit the contraction and expansion movements of the thermostat to the valve. Another object is to provide a valve adjusting device of an efficient character.

My invention will be best understood by reference to the accompanying drawings, in which I have shown a preferred embodiment thereof, and which will now be described, it being premised, however, that various changes can be made in the details of construction and arrangement of the several parts without departing from the spirit and scope of my invention as defined in the appended claims.

In the drawings the numeral 2 designates a frame member or bracket having the externally threaded plug portion 3 adapted to screw into an opening in the wall of a heater, as shown in Fig. 1. 4 and 5 designate a compound thermostat of a well known type which extends into the heater to be affected by the temperature therein.

The frame 2 is formed with the internally threaded socket portion 2ª into which a valve casing 6 is screwed. This casing has the inlet connection 7 at one side and the outlet connection 8 at the opposite side, with an internal port 9 forming a connection between the inlet and outlet sides of the valve chamber. One edge of said opening forms a valve seat 10. 11 is a disk valve adapted to said seat and having an outwardly extending central projection 12 which has a sliding bearing at 13 in the wall of the casing, the latter having the internal boss 14 which extends this bearing. The outer end portion of the extension 12 has an internally threaded socket 12ª into which is screwed the threaded portion 15 of a headed stud 16. This stud is formed with an internal socket 17 which is engaged by one end portion of a threaded adjusting member 18. The other end portion of said member has a reverse thread and engages a threaded socket in a head 19. 20 is a packing or diaphragm which is confined at its edges by a screw cap 20ª which is threaded onto a boss 21 on the end wall of the casing. At its central portion the diaphragm is secured between the shoulder portion of the stud 16 and the outer end of the valve extension 12.

22 designates a multiplying lever pivoted to the frame or bracket at 23 and to which the inner end of the thermostat element 4 is secured at a point adjacent to the pivot. The outer end portion of said lever is of hook shape, as indicated at 24 and embraces the convex end 25 of the short arm of a second multiplying lever 26. The lever 26 has a slotted end portion 27 which extends through a slot 28 of the head 19 and is secured therein by a pin 29, or in any other suitable manner. The convex end 25, together with the recess of the hook, form in effect a ball and socket connection between the two levers, the head 25 preferably fitting closely against opposite sides of the recess so as to prevent any lost motion.

The operation will be readily understood. As the temperature of the heater increases, the movement of the thermostatic element 4, acting through the multiplying levers, tends to draw the valve toward its seat. Both the expansion and contraction movements of this element are positively transmitted to the lever 22 and from said lever to the other lever 26 and thence to the valve. The valve is therefore controlled solely by the action of the thermostat under changes of temperature, no spring or springs acting in opposition to the thermostat being necessary.

It will be observed that the two multiplying levers are so arranged as to greatly multiply the movements of the thermostat between the point of connection of the latter to the lever 22 and the valve. The valve will therefore be very sensitive to slight temperature changes within the heater. The adjusting member 18 forms a simple and convenient means whereby the setting of the valve can be quickly changed so that a greater or less movement of the thermostatic element will be required to impart a given movement to the valve.

30 designates a by-pass port connecting the inlet and outlet sides of the valve chamber for the purpose of supplying a pilot light, if desired. This port may have any suitable controlling device such as the screw valve 31.

My invention provides an extremely simple and effective form of thermostatic valve by which the flow of gas to a heater of any kind may be automatically controlled within close limits.

I claim:

1. In a device of the character described, the combination with a valve to be controlled, of an angle lever having a long arm connected to the valve stem, a second lever fulcrumed in a position at substantially right angles to the first named lever, and having a long arm formed at its extremity with a hook portion having an inner concave surface, the short arm of the first-named lever having a convexed end which is engaged by said hook portion, and a thermostatic element arranged to act on the long arm of the second lever; substantially as described.

2. In a device of the character described, the combination with a valve chamber, and a valve therein having a stem which extends exteriorly of said chamber, of an angle lever having a longer arm formed with a portion extending at substantially right angles to the direction of said arm and having a slotted engagement with a projection on the stem of said valve, said angle lever having a shorter bent arm, a second lever mounted exteriorly of the valve chamber and having a hook portion which embraces the shorter bent arm of the said angle lever, together with a thermostatic element arranged to act upon the second lever; substantially as described.

3. In a device of the character described, the combination with a valve chamber and a valve therein having a stem which extends exteriorly of said chamber, of a thermostatic element located at the opposite side of the chamber from which said valve stem projects, an angle lever having a long arm connected with the projecting portion of the valve stem and a short arm provided with a head, and a second lever engaged by the thermostatic element and having a hook portion engaging the head on the short arm of the first named lever, substantially as described.

In testimony whereof, I have hereunto set my hand.

WILLIAM HOUSHOLDER.

Witnesses:
B. F. MILLER,
F. O. ROBERTSHAW.